(12) United States Patent
Crawford et al.

(10) Patent No.: US 8,938,209 B2
(45) Date of Patent: *Jan. 20, 2015

(54) METHOD TO IMPLEMENT E911 SERVICES IN IMS (IP MULTIMEDIA SUBSYSTEM)

(71) Applicant: AT&T Intellectual Property I, L.P., Atlanta, GA (US)

(72) Inventors: Dwayne Crawford, Indianapolis, IN (US); Richard L. Khan, San Ramon, CA (US); Min Lu, Holdmel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/762,513

(22) Filed: Feb. 8, 2013

(65) Prior Publication Data

US 2013/0148549 A1 Jun. 13, 2013

Related U.S. Application Data

(63) Continuation of application No. 12/484,514, filed on Jun. 15, 2009, now Pat. No. 8,396,445.

(60) Provisional application No. 61/159,522, filed on Mar. 12, 2009.

(51) Int. Cl.
*H04M 11/04* (2006.01)
*H04W 24/00* (2009.01)
(Continued)

(52) U.S. Cl.
CPC .............. *H04M 3/5116* (2013.01); *H04L 45/00* (2013.01); *H04L 45/306* (2013.01);
(Continued)

(58) Field of Classification Search
USPC ................... 455/404.1, 404.2, 456.1, 456.2; 370/352, 353, 354, 355, 356; 379/37, 379/45
See application file for complete search history.

(56) References Cited

U.S. PATENT DOCUMENTS 7,734,019 B1 6/2010 Terpstra
2008/0008157 A1 1/2008 Edge et al.
(Continued)

OTHER PUBLICATIONS

Office Action dated Jan. 19, 2012 for U.S. Appl. No. 12/484,514, 38 pages.

(Continued)

*Primary Examiner* — Kent Chang
*Assistant Examiner* — Nelson Rosario
(74) *Attorney, Agent, or Firm* — Amin, Turocy & Watson, LLP

(57) ABSTRACT

Efficient processing and/or routing of emergency calls in an IMS (IP Multimedia Subsystem) for VoIP (Voice over IP) subscribers can be enabled. In one aspect, an E911 profile is generated, for example, by an application server, for each VoIP subscriber based in part on current location information associated with the subscriber, such as, the subscriber's IP address. The E911 profile is pushed to the HSS (Home Subscriber Server) of the IMS. The E911 profile can then be stored in the HSS and can be queried by an E-CSCF (Emergency Call Session Control Function) during emergency call processing. Moreover, when an emergency call is received from the subscriber, the E-CSCF can retrieve the E911 profile associated with the subscriber from the HSS and route the call to an appropriate PSAP (Public Safety Answering Point) based on an analysis of the information in the E911 profile.

20 Claims, 14 Drawing Sheets

(51) Int. Cl.
*H04M 3/51* (2006.01)
*H04L 12/701* (2013.01)
*H04L 12/725* (2013.01)
*H04M 3/42* (2006.01)
*H04W 4/22* (2009.01)
*H04W 76/00* (2009.01)
*H04L 29/06* (2006.01)
*H04W 88/18* (2009.01)
*H04L 29/08* (2006.01)

(52) U.S. Cl.
CPC ......... *H04M 3/42348* (2013.01); *H04M 11/04* (2013.01); *H04W 4/22* (2013.01); *H04W 76/007* (2013.01); *H04L 65/1016* (2013.01); *H04L 65/40* (2013.01); *H04L 65/1069* (2013.01); *H04M 2207/18* (2013.01); *H04M 2242/04* (2013.01); *H04M 2242/15* (2013.01); *H04W 88/18* (2013.01); *H04L 67/306* (2013.01)
USPC .................. 455/404.1; 455/404.2; 455/456.1; 455/456.2; 379/37; 379/45

(56) References Cited

U.S. PATENT DOCUMENTS

| | | |
|---|---|---|
| 2008/0013523 A1 | 1/2008 | Nambakkam |
| 2008/0089486 A1* | 4/2008 | Madour et al. .................. 379/45 |
| 2009/0003312 A1 | 1/2009 | Velazquez et al. |
| 2009/0110154 A1 | 4/2009 | Colunga |
| 2009/0141870 A1* | 6/2009 | Coster et al. .................... 379/45 |
| 2009/0253399 A1* | 10/2009 | Snapp ........................ 455/404.1 |
| 2010/0172345 A1 | 7/2010 | Bjorsell et al. |
| 2010/0246780 A1 | 9/2010 | Bakker et al. |
| 2011/0096769 A1 | 4/2011 | Sim |

OTHER PUBLICATIONS

Office Action dated Jul. 18, 2012 for U.S. Appl. No. 12/484,514, 36 pages.

* cited by examiner

METHOD TO IMPLEMENT E911 SERVICES IN IMS (IP MULTIMEDIA SUBSYSTEM)

CROSS-REFERENCE TO RELATED APPLICATIONS

This application is a continuation of U.S. patent application Ser. No. 12/484,514, filed on Jun. 15, 2009, and entitled "A METHOD TO IMPLEMENT E911 SERVICES IN IMS (IP MULTIMEDIA SUBSYSTEM)," which claims the benefit of U.S. Provisional Patent Application No. 61/159,522, filed on Mar. 12, 2009, and entitled "A METHOD TO IMPLEMENT E911 SERVICES IN IMS (IP MULTIMEDIA SUBSYSTEM)." The entireties of each of the above noted applications are incorporated herein by reference.

TECHNICAL FIELD

The subject innovation relates to wireline communications and, more particularly, a system and methodology that enables E911 capability to be supported on an architecture defined by 3GPP ($3^{rd}$ Generation Partnership Project) IMS (IP Multimedia Subsystem) standards for E911 (Enhanced 911).

BACKGROUND

Technological advances have provided various sectors of society like government, industry, commerce and entertainment with access to networked information in order to increase operational and commercial efficiencies. Mobile data communications is evolving quickly because of global communication networks and devices such as the Internet, intranets, laptops, PDAs (personal digital assistants) and increased requirements of workforce mobility. Moreover, third generation mobile system (3G) technologies (e.g., UMTS-Universal Mobile Telecommunications System) are being developed and are considered enhancements to GSM (Global System for Mobile telecommunications) cellular standards.

3GPP (Third generation partnership project) standards define an IMS (IP Multimedia Subsystem) architecture that provides a horizontal layered architecture with a common IP (Internet Protocol)-based connectivity for services. The IMS architecture enables convergence of data, speech and mobile network technology over an IP-based infrastructure and enhances real time, multimedia mobile services such as rich voice services, video telephony, messaging services, conferencing, and push services. Specifically, the IMS standard defines a generic architecture for offering Voice over IP (VoIP) and multimedia services for both wireless and wireline access. VoIP services provide increased mobility, for example, subscribers can log on with their chosen device at different locations and their calls can be routed to them. However, the increased mobility increases the complexity involved with determination of accurate location information, employed during emergency calls.

A fixed line telephone has a direct relationship between its telephone number and a physical location and thus the physical location for emergency calls originating from that number is known. Accordingly, the emergency call can be routed to PSAP (Public Safety Answering Point) that is closest to the physical location, such that, emergency crew can respond in the shortest possible time. With VoIP services, users can be mobile and determination of a current physical address when an emergency call is received can be tedious, complex and/or inaccurate. Some conventional systems collect location information and/or contact information from subscribers. The onus is on the subscriber to provide the location information, but the VoIP provider must provide the customer with a means of updating this information. However, for nomadic wireline users, the overhead of constantly having to update location information can be time consuming and tedious. Another shortcoming of VoIP E911 is that the emergency system is based on a static table lookup. Unlike in cellular phones, where the location of an E911 call can be traced using GPS, cellular triangulation, or other methods, the VoIP E911 information is only accurate so long as subscribers are diligent in keeping their emergency address information up-to-date.

DETAILED DESCRIPTION

Figure 1:
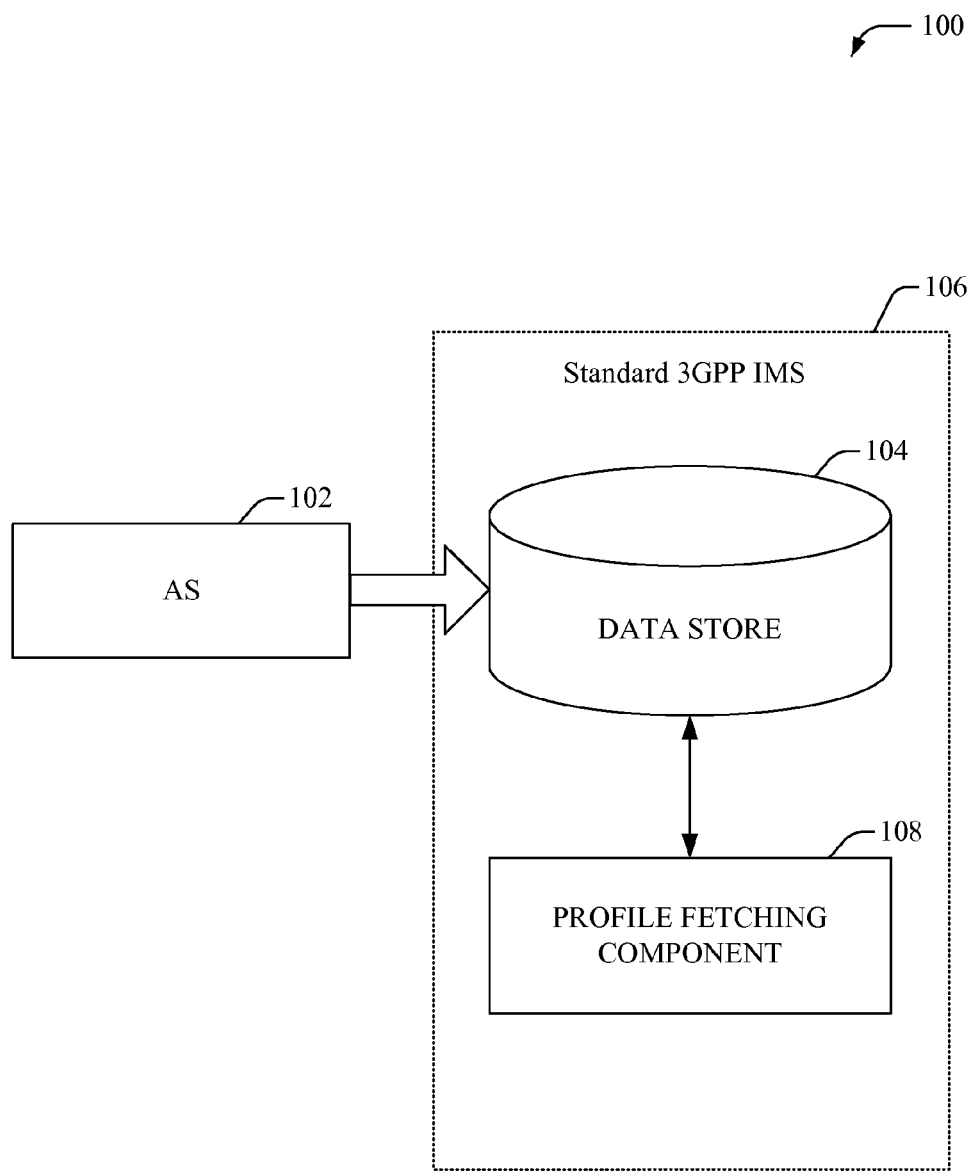
FIG. 1 illustrates an example system that can be employed to facilitate storing and utilizing current user location data in a 3GPP IMS that is utilized for emergency call routing in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "phone," "mobile station," "mobile," subscriber station," "access terminal," "terminal," "handset,", and similar terminology, refer to a wireless and/or wired device utilized by a subscriber or user of a wireless and/or wired communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows.

Furthermore, the terms "user," "subscriber,", "operator", "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit. It can be appreciated that the IMS standards can be the technical specification defined by the 3rd Generation Partnership Project's (3GPP's) Technical Specification Group Services and System Aspects entitled "IP Multimedia Subsystem (IMS) emergency sessions (Release 7)" and identified as "TS 23.167 V7.2.0 (2006-09)", which is incorporated herein by reference in its entirety.

The systems and methods disclosed herein, in one aspect thereof, can facilitate handling emergency calls on an architecture defined by 3GPP IMS standards for E911. Specifically, the method comprises pushing updated E911 profile parameters to an HSS (Home Subscriber Server), such that, the HSS contains a current E911 profile associated with each subscriber. When the E-CSCF in the IMS receives an emergency call from a subscriber, the E-CSCF retrieves the appropriate E911 profile parameters of the subscriber from the HSS. Moreover, the E-CSCF employs the E911 profile parameters to determine a route for the received emergency call.

Business VOIP service can include capabilities to automatically determine a subscriber's location when the subscriber is placing a 911 call from any location associated with a business customer that has multiple locations, and then route/send the 911 call to the PSAP (Public Safety Answering Point) that serves the location, in a manner transparent to the user. The service logic supporting this capability can reside in an Application Server (AS) or most any network element. The disclosed innovation, relates to interfacing the application logic to the IMS network by pushing user information (e.g., location data) to an HSS in the IMS. It can be appreciated that the subject disclosure is not limited to 911 calls and can be used for most any emergency calls and/or can comply with FCC E911 requirements for VoIP service.

In accordance with another aspect of the system, a call receiving component can be employed to receive an emergency call from a VoIP subscriber. A profile fetching component can query a data store (e.g., HSS) in the IMS to retrieve an E911 profile for the subscriber stored in the data store. It can be appreciated that an E911 profile can be created for each VoIP subscriber, for example, by an application server and the profile data can be pushed to a data store (e.g., HSS) within the IMS. Further, a profile analysis component can perform an analysis of the retrieved E911 profile to facilitate processing of the received emergency call. In one aspect, the profile analysis component can utilize E911 profile information to determine an optimal route for the emergency call. Furthermore, a routing component can route the received emergency call to a PSAP, which can be selected based in part on the analysis.

Another aspect of the subject innovation comprises a monitoring component that facilitates monitoring changes in a VoIP subscriber's location based in part on registration information, such as, but not limited to, an IP address employed during registration with the network. A location determination component can be utilized to determine and/or classify the VoIP subscriber's location, when a change in location is identified by the monitoring component. In one example, the location determination component can determine that the subscriber is at a home location, a disparate tenant location or is nomadic. Based in part on the determined subscriber location, a profile generation component can populate parameters in an E911 profile associated with the subscriber, such as, but not limited to, a Temporary Telephone Number (TTN), an Emergency Services Routing Number (ESRN), a LRF (Location Routing Function) indicator, etc. The generated/updated E911 profile can then be pushed to a data store (e.g., HSS) in the IMS by a profile pushing component, wherein the E911 profile can be stored and utilized for routing an emergency call received in the IMS from the VoIP subscriber.

Yet another aspect of the disclosed subject matter relates to a method that can facilitate storing information associated with a subscriber's current location in a data store within an IMS. Specifically, subscriber's location information can be received, for example, during registration. According to an aspect, the subscriber's IP address can be employed to identify the subscriber's current location (e.g., the subscriber is located at the subscriber's home location, the subscriber is visiting a tenant location, or the subscriber is nomadic). The method comprises generating an E911 profile for the subscriber based in part on the subscriber's identified location, for example, by populating parameters, such as, the TTN, ESRN, and/or LRF indicator. The E911 profile can then be pushed to and stored in a data store, such as, the HSS and can be queried by an E-CSCF during emergency call processing.

Still another aspect of the system comprises a method for routing emergency calls from a VoIP subscriber. The method comprises receiving an emergency call from the subscriber, retrieving an E911 profile associated with the subscriber from an HSS (or most any data store) in the IMS, and analyzing the retrieved E911 profile. Further, the emergency call can be routed to an appropriate PSAP based on an analysis of the E911 profile.

Referring initially to FIG. 1, there illustrated is an example system 100 that can be employed to facilitate storing and utilizing current user location data in a 3GPP IMS that is utilized for emergency call routing in accordance with an aspect of the subject specification. VoIP services enable a subscriber to communicate by employing an Internet connection, for example, a high-speed (broadband) Internet connection, such as Digital Subscriber Line (DSL), cable modem, or wireless broadband. Moreover, VoIP service provides subscribers with a portable phone service that can be used from any location with internet access. System 100 can typically include an Application Server (AS) 102 that can be employed to determine a subscriber's current location and accordingly update location parameters in a data store 104 in the IMS 106.

The location parameters can be employed to determine an optimal route to transfer an emergency call placed by the subscriber. For example, emergency calls can be directed to a PSAP (Public Safety Answering Point) located closest to the current location of the subscriber. In another example, an emergency call can be directed to a PSAP that has most available resources to help the subscriber. It can be appreciated that the emergency call can be placed by a subscriber by dialing a predefined number, such as, "911" in the United States, "999" in the United Kingdom, etc. on the UE (user equipment).

According to an embodiment, the AS 102 can detect registration of a subscriber and determine location information for the subscriber based on the registration information. In an aspect, the AS 102 can identify the IP address of the subscriber on registration and determine whether the subscriber is at a home location, a disparate tenant location or is nomadic. Moreover, a home location can be a location associated with the subscriber during provisioning, while a tenant location can be most any disparate location associated with the service provider. In one aspect, the AS 102 can include a list of IP addresses associated with the tenant. The list can be stored on an internal database of can be accessed remotely.

During registration, the AS 102 can detect if the subscriber has moved to a new location and accordingly update parameters in an E911 profile associated with the subscriber. Based in part on the identified IP address, the AS 102 can determine the location of the subscriber. For example, the AS 102 can determine an IP address of the home location associated with the subscriber, and can determine that the subscriber is not at the home location when the identified IP address is not the same as the home IP address. Further, the AS 102 can determine if the subscriber has registered with one of the IP addresses in the list. If determined that the identified IP address is in the list, the AS 102 can determine that the subscriber is visiting a tenant location, else the AS 102 can determine that the user is nomadic.

Once the current location information for the subscriber is determined, the AS 102 can generate and/or update an E911 profile associated with the subscriber. The E911 profile can typically include parameters such as, but not limited to, a Temporary Telephone Number (TTN), an Emergency Services Routing Number (ESRN), a LRF (Location Routing Function) indicator, etc. Further, the AS 102 can push the generated profile data to a data store 104 (e.g., HSS) in the IMS 106. It can be appreciated that the data store can be a dedicated database for emergency call handling or can be an existing database within the IMS 106, such as, but not limited to the HSS (Home Subscriber Server).

The data store 104 can store the E911 profiles for multiple subscribers and can be accessed by the IMS when an emergency call is received from a subscriber. Moreover, during emergency call processing, a profile fetching component 108, for example, an E-CSCF (Emergency Call Session Control Function), in the IMS 106 can query the data store 104 for E911 profile information associated with the calling subscriber. The E911 profile information can be analyzed and a route for directing the call can be determined based on the analysis, as explained in detail infra.

It can be appreciated that the data store 104 described herein can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 2:
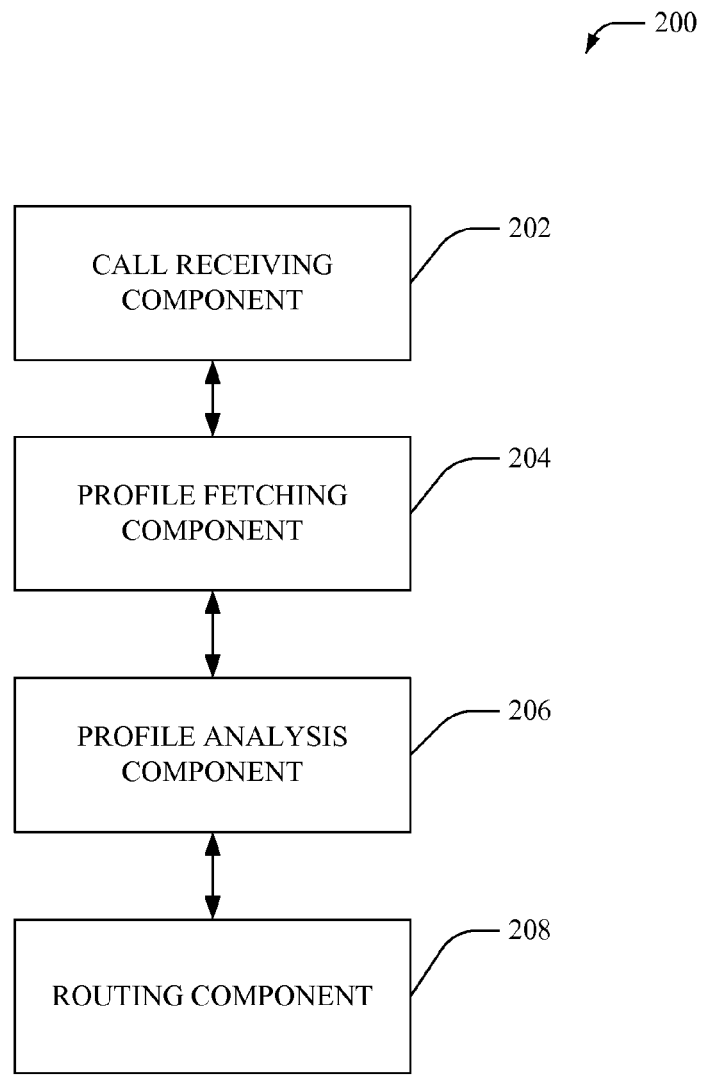
FIG. 2 illustrates an example system that can be employed to facilitate routing of emergency calls in an IMS (IP multimedia subsystem), according to an aspect of the subject innovation.

FIG. 2 illustrates an example system 200 that can be employed to facilitate routing of emergency calls in an IMS, according to an aspect of the subject innovation. The system 200 can typically be employed for most any emergency or special calls placed by a subscriber, wherein routing of the call utilizes location information associated with the subscriber. In one aspect, system 200 can be employed in VoIP (Voice over IP) services, for example, for a business customer. As an example, system 200 can be utilized within the E-CSCF (Emergency Call Session Control Function) in the IMS.

Typically, system 200 can include a call receiving component 202 that can be employed to receive a call from a user. The call receiving component 202 can determine whether the received call is an emergency call or a high priority or special call (e.g., a call that employs user location information). Further, a profile fetching component 204 can query a data store in the IMS, for example, data store 104 (FIG. 1). It can be appreciated that profile fetching component 204 and profile fetching component 108 can be substantially similar and can include functionality described with respect to systems 100 and 200.

The profile fetching component 204 can retrieve profile information associated with the calling party (e.g., subscriber) for the received call from the data store (e.g., HSS). In an aspect, the profile information can include, but is not limited to, an E911 profile, that can comprise routing information, current user location information, user call back numbers, etc. According to an aspect, the E911 profile for the user includes up-to-date or current routing information based on the current location of the user. For example, an application server can be employed to generate an E911 profile for each user and push the profile to the data store (e.g., HSS) in the IMS.

Further, a profile analysis component 206 can analyze the information within the retrieved profile and accordingly determine a routing path for the received emergency call. The routing path can be optimal based on the available resources or can utilize minimum number of resources. In one aspect, the profile analysis component 206 can utilize E911 profile information to select a trunk to an SR (selective router), which serves a PSAP (Public Safety Answering Point) that serves the caller's location. For example, a PSAP closest to the location of the user can be selected. In another example, a PSAP that has a maximum number of available resources can be selected. Moreover, the profile analysis component 206 can dynamically determine an optimal PSAP that can service and/or attend to the received emergency call for the user.

The system 200 can further include a routing component 208 that can be employed to route the received emergency call to the selected PSAP based in part on the analysis. In one example, the routing component 208 can utilize E911 profile information to route the received emergency call to an appropriate BGCF (Breakout Gateway Control Function) and/or ESGW (Emergency Services Gateway). Accordingly the call can be routed to an optimal PSAP and can be serviced by the emergency personnel (e.g., police, firefighters, paramedics, etc.).

Figure 3:
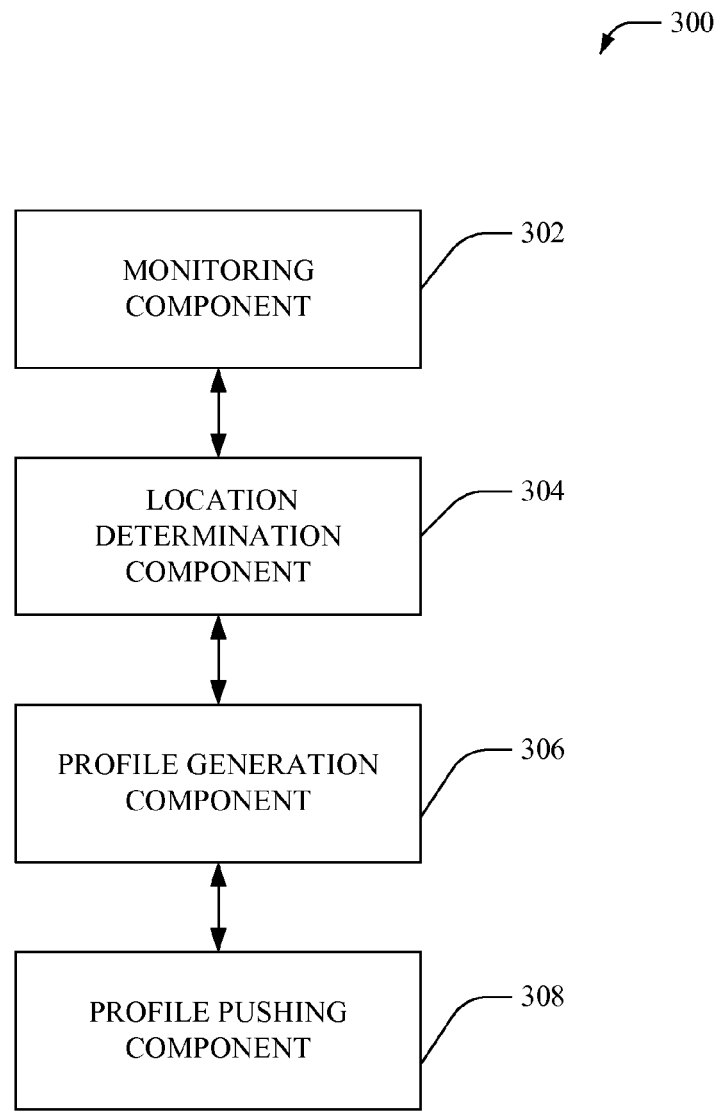
FIG. 3 illustrates an example system that can be employed to generate an E911 (Enhanced 911) profile for a VoIP subscriber and deliver the E911 profile to the IMS in accordance with the subject disclosure.

Referring now to FIG. 3, there illustrated is an example system 300 that can be employed to generate an E911 profile for a subscriber and deliver the E911 profile to the IMS in accordance with the subject disclosure. In one example, system 300 can be utilized within an application server (AS) (not shown) external to the IMS. Moreover, system 300 can gather and/or aggregate current user information, update or generate a user E911 profile and push the updated or generated E911 profile to a data store within the IMS.

The system 300 can typically include a monitoring component 302 that can monitor a user's current location and/or identify a change in a user's location. The monitoring component can receive user related information, for example, a user's IP address, when a user's phone is relocated. In one example, the monitoring component 302 can monitor and identify when a user registers to the network (e.g. VoIP network). Specifically, the monitoring component 302 can determine an IP address utilized during registration. If the IP address has changed or is new, the monitoring component 302 can determine that the user has moved to a new location.

When determined that the user location has changed (e.g. by the monitoring component 302), a location determination component 304 can be employed to identify the new/changed location of the user. For example, the location determination component 304 can identify whether the user is at a home location, a disparate tenant location or is nomadic. As discussed previously, a home location can be a location associated with the user during provisioning, while a tenant location can be most any disparate location associated with the service provider. Specifically, business VoIP (BVoIP) customers can have multiple business locations with multiple users residing at each location. These locations can be referred to as tenant locations. Each user can be associated with a home tenant location and can freely visit other tenant locations. BVoIP users can utilize their handsets from the home tenant location, any visiting tenant location, and/or any location that has broadband access. When a user is not located at a tenant location or home location, the user is said to be nomadic. The location determination component 304 can be employed to determine the user's current location, for example, home tenant location, visiting tenant location, other location that has broadband access, nomadic, etc.

In one aspect, the location determination component 304 can compare the identified IP address with a list of IP addresses associated with the tenant to determine the location of the user. The list can be stored on an internal database or can be accessed remotely. If the identified IP address matches a home IP address associated with the user, the location determination component 304 can determine that the user is at a home location. Further, if the identified address does not match the home IP address, but matches most any IP address within the tenant IP address list, the location determination component 304 can determine that the user is visiting the associated tenant location. Furthermore, when the identified IP address does not match addresses in the list or the home IP address for the user, the location determination component 304 can determine that the user is nomadic.

Based in part on the determined user location, a profile generation component 306 can be utilized to populate an E911 profile associated with the user. The profile generation component 306 can generate a new profile and/or update an existing profile for the user based in part on the change in user location. Typically, the profile generation component 306 can update parameters in the E911 profile, such as, but not limited to a call back number, routing information, etc. Population of the E911 profile is discussed in detail with respect to FIG. 4, infra. In one example, the E911 profile associated with a user, can include parameters, such as, but not limited to, a Temporary Telephone Number (TTN), an Emergency Services Routing Number (ESRN), a LRF (Location Routing Function) indicator, etc.

The system 300 can further include profile pushing component 308 that can be employed to push the generated E911 profile to a data store (e.g. HSS) in the IMS, where the profile can be stored for future use by the IMS. In one example, the profile pushing component 308 can utilize a Sh interface for delivering information to the HSS. Moreover, an E-CSCF in the IMS can retrieve and process the stored profile associated with a particular subscriber, when an emergency call is received from the subscriber to determine routing information for the received call.

Figure 4:
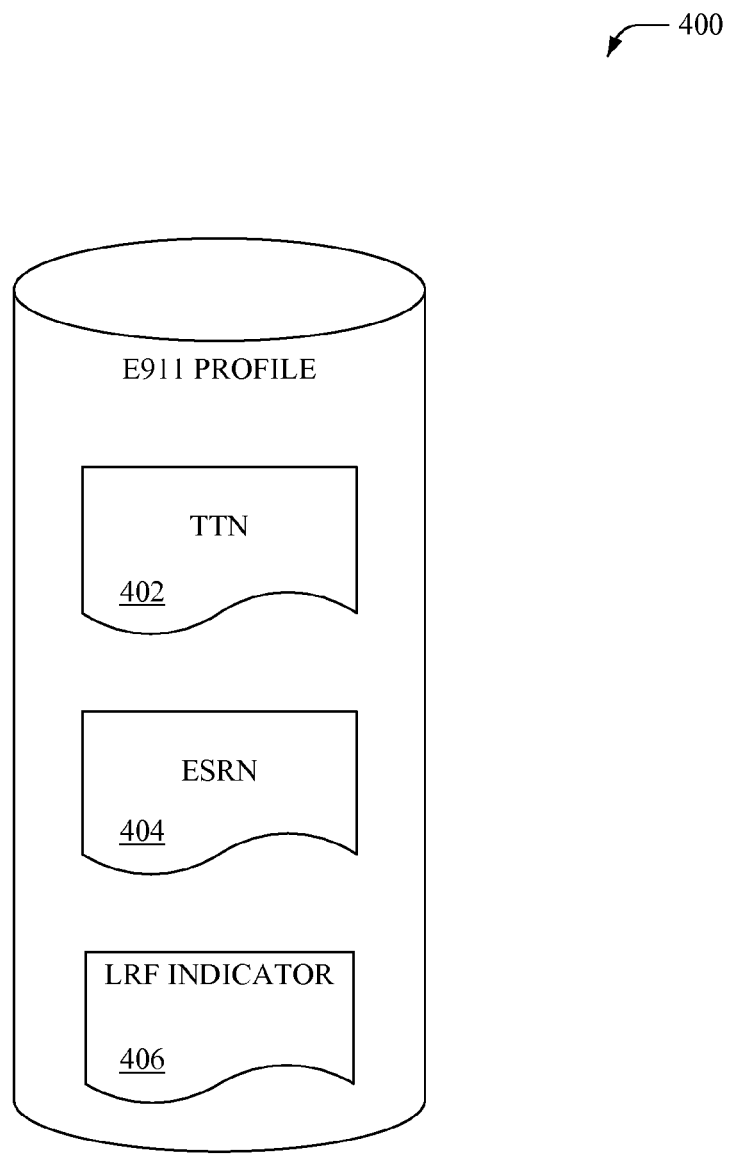
FIG. 4 illustrates an example E911 profile that facilitates optimal routing of emergency calls in an IMS in accordance with an aspect of the subject specification.

FIG. 4 illustrates an example E911 profile 400 that facilitates optimal routing of emergency calls in an IMS in accordance with an aspect of the subject specification. The E911 profile can be generated (e.g., by the profile generation component 306 in FIG. 3) for each subscriber associated with the service provider and be utilized to store current subscriber information. In one example, the current subscriber information can be based in part on a subscriber's current location, which can be determined (e.g., by the location determination component 304 in FIG. 3) by monitoring subscriber registration (e.g., by the monitoring component 302 in FIG. 3).

According to an embodiment, the E911 profile for each subscriber can be generated and stored in a data store, such as, but not limited to, an HSS in the IMS. In one example, the E911 profile 400 can include various parameters that can be populated based in part on the current subscriber location. For example, the parameters can include, but are not limited to, a Temporary Telephone Number (TTN) 402, an Emergency Services Routing Number (ESRN) 404, and/or a LRF (Location Routing Function) indicator 406.

The TTN 402 can be employed as an ANI (Automatic Number Identification) for an emergency call, when a subscriber is located at a visiting tenant location. Typically, one TTN value can be predefined for each tenant location during an initial setup and can be predefined in the 911/emergency system. It can be appreciated however, that the predefined TTNs can be updated and/or modified at most any time, for example, by a network operator or service provider. Moreover, the TTN 402 can be employed by a selective router to route an emergency call to a PSAP serving the visiting tenant location and as a call back number, in the event the PSAP needs to contact the subscriber after the emergency call has ended. Further, the ESRN 404 can be utilized by the IMS network (e.g., by an Emergency Services Gateway) to select a trunk to the selective router that serves the PSAP that serves the caller's location. Furthermore, the LRF indicator 406 can be employed to identify when the E-CSCF should query an LRF for additional routing information. Typically, the LRF query is performed when a subscriber is nomadic. However, it can be appreciated that the LRF can also be queried when a subscriber is located at a tenant location.

In one aspect, the parameters in the E911 profile can be populated (e.g., by the profile generation component 306 in FIG. 3) based on the location of the subscriber, as described infra. For example, when determined (e.g., by the location determination component 304 in FIG. 3) that the subscriber is at its home location, the TTN parameter can be populated as null and it can be determined whether an LRF query is required. If the query is not needed, a predefined ESRN can be assigned and the LRF indicator can be set to "No". However, if determined that an LRF query is required, the LRF indicator can be set to "Yes" and the ESRN can be assigned as null. In another example, when determined that the subscriber is located at a visiting tenant location (e.g., by the location determination component 304 in FIG. 3), a TTN can be assigned to the subscriber's profile and it can be determined whether an LRF query is required. If the LRF query is not required, a predefined ESRN can be assigned and the LRF indicator can be set to "No". Alternately, if a query is required, the LRF indicator can be set to "Yes" and the ESRN can be populated as null. In yet another example, when determined that the subscriber is nomadic (e.g., by the location determination component 304 in FIG. 3), the LRF indicator can be set to "Yes" and both the ESRN and TTN parameters can be populated as null. It can be appreciated that population of parameters as discussed supra can be performed, for example, by the profile generation component 306 in FIG. 3, the AS 102 in FIG. 1, etc. The E911 profile for each subscriber can be pushed to a data store in the IMS, such that, during emergency call processing, the E911 profile can be accessed by components of the IMS. In particular, the E-CSCF can analyze the parameters in the subscriber's E911 profile to process and route the emergency call from that subscriber.

Figure 5:
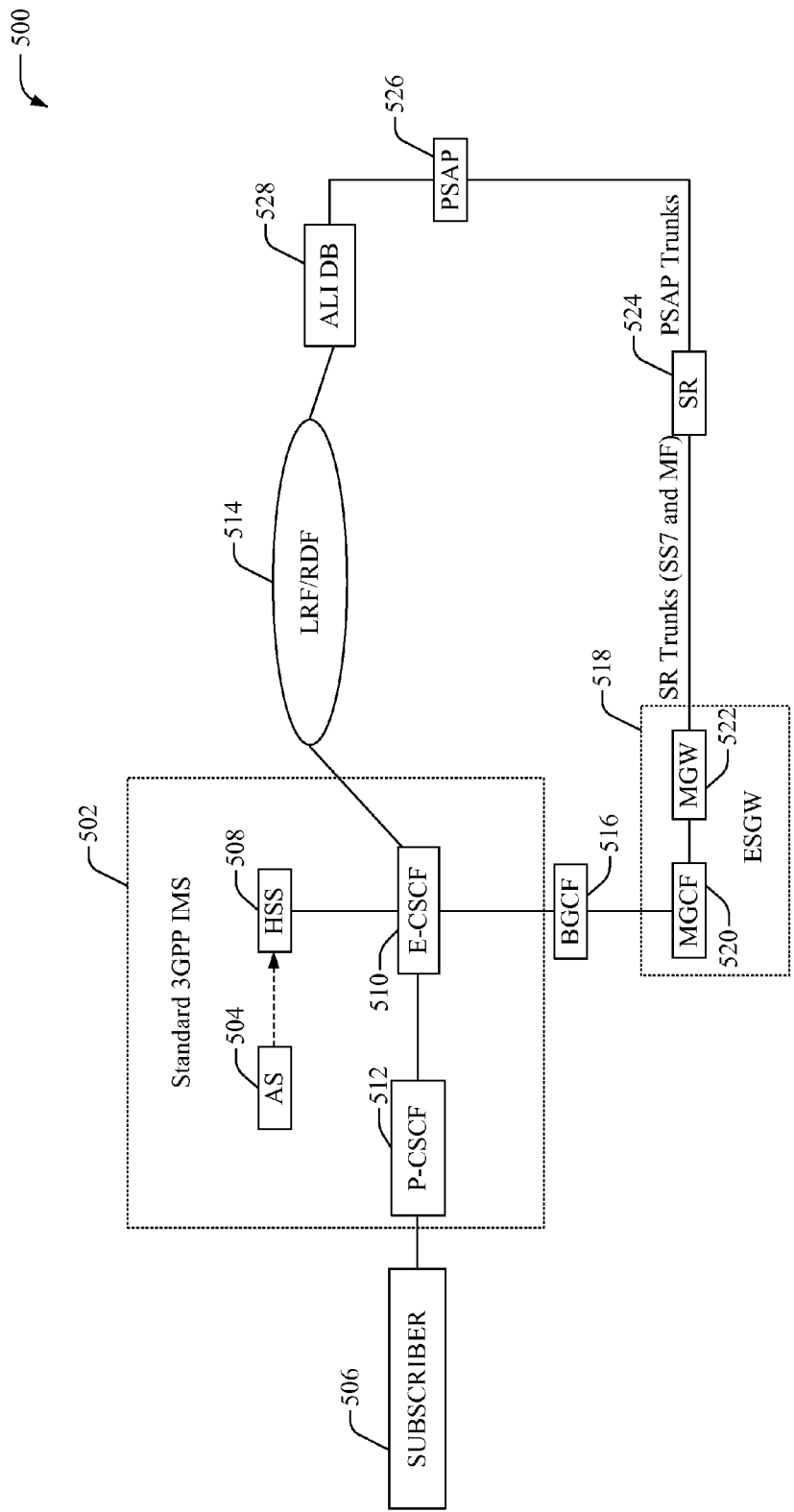
FIG. 5 illustrates an example architecture that facilitates emergency call processing and routing in an IMS, according to an aspect to the subject specification.

Referring now to FIG. 5, there illustrated is an example architecture 500 that facilitates emergency call processing and routing in an IMS 502, according to an aspect to the subject specification. In one aspect, system 500 can include an application server (AS) 504 that can include components of system 300 (not shown), an HSS 508 and an E-CSCF 510 that can include component of system 200 (not shown). It can be appreciated that AS 504 can be substantially similar to AS 102 (FIG. 1) and can include functionality, as more fully described herein, for example, with regard to system 100.

According to an aspect, when a subscriber 506 relocates, the subscriber's phone can reboot and register with the network 502. The reboot procedure and new registration can be detected by the network 502 and the AS 504 can be notified. In one example, the notification provided to an AS 504 can include the phone's current IP address. Typically, the AS 504 can maintain a list of the IP addresses associated with each tenant location (home and visiting). Upon receiving the notification, the AS 504 can employ the IP address provided in the notification to determine whether the subscriber is located at the subscriber's home tenant location or at a visiting tenant location, or if the subscriber is nomadic (e.g., by the location determination component 304).

According to one embodiment, when the IP address provided in the notification to the AS 504 indicates the subscriber is located at the home tenant location, the AS 504 can populate the TTN parameter as null and determine whether an LRF query is required. If determined that the query is not needed, the AS 504 can assign an ESRN (Emergency Service Routing Key) and set the LRF indicator to "No". If a query is required, the AS 504 can set the LRF indicator to "Yes" and populate the ESRN as null. It can be appreciated that the population of profile parameters can be facilitated by the profile generation component (306 in FIG. 3). The AS 504 can then push the newly created or updated E911 profile to the HSS 508 (e.g., by the profile pushing component 308), for example, via a Sh interface.

Continuing with the example when the subscriber 506 is at the home location, the subscriber 506 can initiate an emergency call at most any time, for example, by dialing 911 from the phone. The call can flow to a P-CSCF (Proxy-Call Session Control Function) 512, which can determine that the call is an emergency call and route the call to E-CSCF 510. On receiving the emergency call, the E-CSCF 510 can query the HSS 508 to receive the E911 profile associated with the subscriber 506. The E911 profile indicates that the subscriber is at their home location, and accordingly, the E-CSCF 510 can receive the ESRN. Specifically, when the LRF indicator is set to "No", the ESRN is received from the HSS 508 and when the LRF indicator is set to "Yes", an LRF/RDF (Location Routing Function or Routing Determination Function) 514 can be queried to receive the ERSN. The E-CSCF 510 employs the ESRN to route the call to the appropriate BGCF (Breakout Gateway Control Function) 516 which transfers the call to an ESGW (Emergency Services Gateway) 518. Generally, the ESGW 518 can comprises a media gateway controller function (MGCF) 520 coupled with a media gateway (MGW) 522. The MGCF 520 can employ the ESRN to determine which trunks it can deliver the call over. The trunks are connected to the appropriate SR (selective router) 524. The MGCF 520 can deliver the call over the determined trunks, and can replace the ESRN with the digits 911. The SR 524 can receive the call and determine a PSAP 526 that the call should be delivered to, based in part on a table/database lookup. The call can then be delivered to the determined PSAP 526, which can query an ALI DB (Automatic Location Identification database) 528 to pull up an ALI record for the call. Accordingly, the PSAP 526 can receive the emergency call along with most any essential data to respond to the call.

According to another embodiment, when the IP address provided in the notification to the AS 504 indicates the subscriber 506 is located at a visiting tenant location (e.g., identified by the location determination component 304), the AS 504 (e.g., by employing the profile generation component 306) can assign a TTN to the subscriber's profile and determine whether an LRF query is required. It can be appreciated that the assigned TTN value can be predefined and associated with the tenant location. If the LRF query is not needed, the AS 504 can assign an ESRN associated with the TTN and set the LRF indicator to "No". If a query is required, the AS 504 can set the LRF indicator to "Yes" and populate the ESRN as null. The AS 504 can then push the updated E911 profile to the HSS 508 (e.g., by the profile pushing component 308).

Continuing with the example when the subscriber 506 is at a tenant location, the subscriber 506 can make an emergency call from the tenant location, for example, by dialing 911 from the phone. The call can then flow through the P-CSCF 512, which can determine that the received call is an emergency call and route the call to E-CSCF 510, which then queries HSS 508 to fetch an appropriate E911 profile for the subscriber 506. The E911 profile comprises the TTN and ESRN associated with the TTN. In one example, when the LRF indicator is set to "Yes", the ESRN can be retrieved from the LRF/RDF 514. The E-CSCF 510 can utilize the ESRN as the call-in number and the TTN as the calling party number. Further, the E-CSCF 510 can deliver the call to a BGCF 516, which can determine an appropriate ESGW 518 for routing the call. In addition, the MGCF 520 can set up the call to the appropriate SR 524 by employing the ESRN to select the appropriate trunks. Further, the MGCF 520 can replace the ESRN with the digits 911 and send the TTN as the calling party number. When the SR 524 receives the call, the SR 524 can employ the calling party number (TTN) to lookup a database (not shown) for selecting a PSAP 526 to service the call. The PSAP 526 can query the ALI DB 528 with the TTN and fetch the ALI record associated with the TTN. Moreover, the PSAP 526 can employ the ALI record and/or the call back number to attend to the emergency call.

In yet another embodiment, when the IP address indicates the subscriber is nomadic (e.g., identified by the location determination component 304), the AS 504 can set the LRF indicator to "Yes" and populate the ESRN and TTN parameters as null (e.g., by employing the profile generation component 306). The AS 504 can then push the updated E911 profile to the HSS 508 (e.g., by the profile pushing component 308). When the nomadic subscriber initiates an emergency call (e.g. by dialing 911 from the phone), the P-CSCF 512 can receive the call and route the call to the E-CSCF 510. The E-CSCF 510 can then retrieve an E911 profile for the subscriber 506 from the HSS 508. However, the E911 profile for the nomadic subscriber comprises null values for the TTN and ESRN. Additionally the LRF indicator is set to "Yes". Accordingly, the E-CSCF 510 queries the LRF/RDF 514 with the calling party number to receive an ESRN and an Emergency services query key (ESQK). The ESQK can be utilized as the calling party number. Further, the call can be routed to the BGCF 516, which can employ the ESRN to determine an appropriate ESGW 518 for routing the call. Similar to the previous examples, the MGCF 520 can employ the ESRN to select the appropriate trunks and set up the call to an appropriate SR 524. In addition, the MGCF 520 can replace the ESRN with the digits 911 and send the ESQK as the calling party number to the SR 524. The SR 524 employs the ESQK as a query key to determine a PSAP 526 that can service the call. The call can then be routed to the determined PSAP 526 and the ESQK can be utilized as the ANI for the call. The PSAP 526 can query the ALI DB 528 with the ESQK, which in turn can query the LRF/RDF 514 to obtain an address for the subscriber and/or a calling party number associated with the call. The PSAP 526 can employ the obtained information for responding to the received call.

Moreover, in each scenario, the 510 can perform at least the following, based on the E911 profile parameters:

1. Send the subscriber's telephone number as the ANI for the emergency call when the TTN parameter is populated as null.
2. Send the contents of the TTN parameter as the ANI for the emergency call when that parameter is populated with a value other than a null value.
3. Query the LRF/RDF 514 when the LRF indicator is set to "Yes".
4. Utilize the ESRN to route the call to the appropriate BGCF 516 and/or ESGW 518 when the ESRN parameter is populated with a value other than null.

Figure 6:
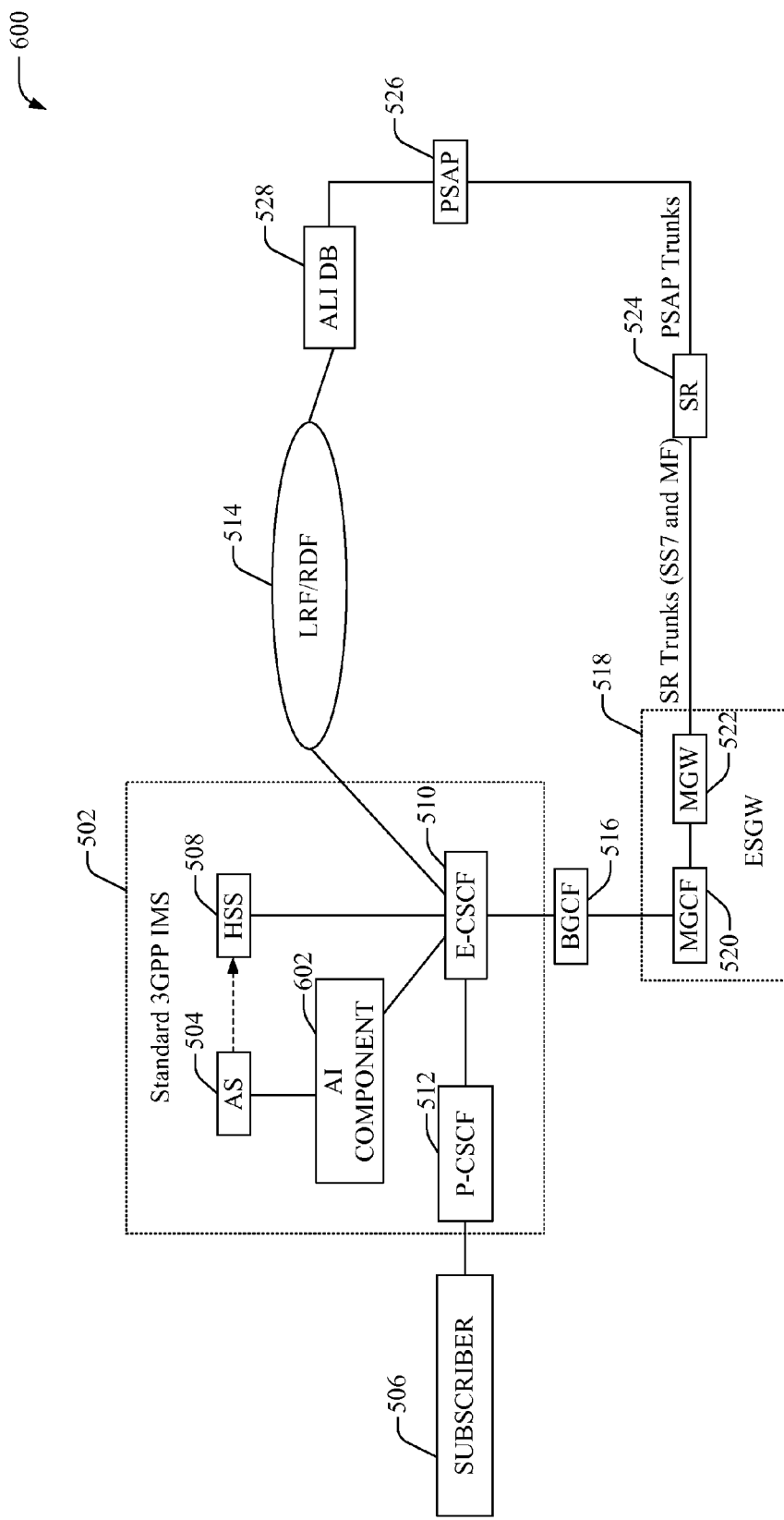
FIG. 6 illustrates an example system that facilitates automating one or more features by employing machine learning techniques in accordance with the subject innovation.

Referring now to FIG. 6, there illustrated is an example system 600 that employs an artificial intelligence (AI) component 602, which facilitates automating one or more features in accordance with the subject innovation. It can be appreciated that the AS 504, subscriber 506, HSS 508, E-CSCF 510, PCSCF 512, LRF/RDF 514, BGCF 516, ESGW 518, MGCF 520, MGW 522, SR 524, PSAP 526 and ALI DB 528 can each include their respective functionality, as more fully described herein, for example, with regard to system 500. The subject innovation (e.g., in connection with E911 profile analysis, determination of current user location, determination of optimal PSAP, etc.) can employ various AI-based schemes for carrying out various aspects thereof. For example, a process for determining current user location, optimal PSAP, emergency call routing etc. can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria current user location, E911 profile parameters, optimal PSAP, emergency call routing etc. can be facilitated via an automatic classifier system and process.

Figure 7:
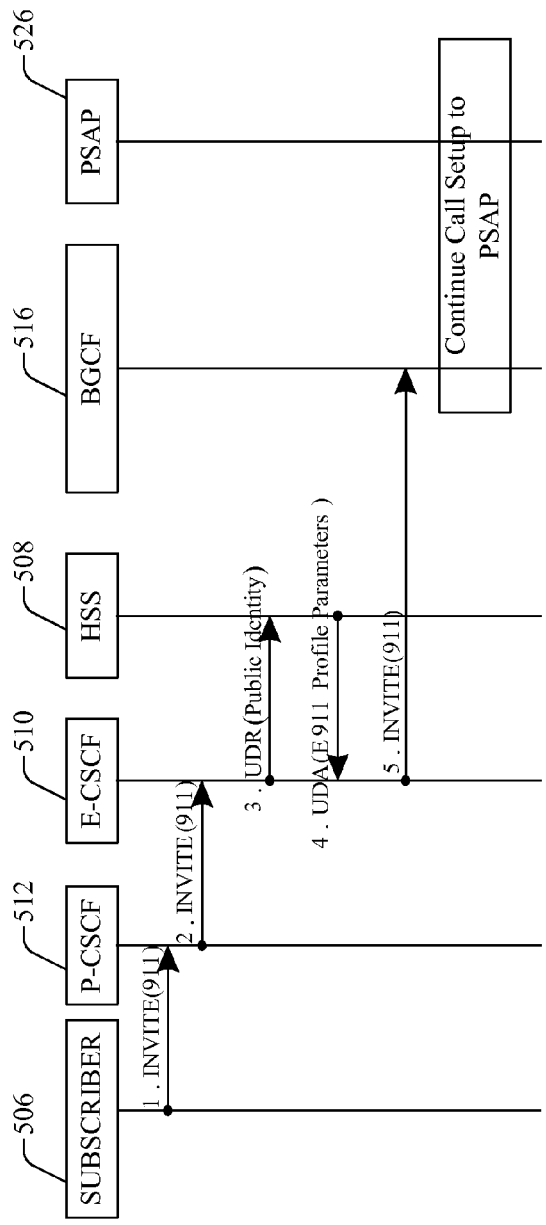
FIG. 7 illustrates an example call flow that depicts processing of an emergency call from a subscriber that has moved to a visiting tenant location, according to an aspect of the subject innovation.

FIG. 7 illustrates an example call flow 700 that depicts processing of an emergency call from a subscriber that has moved to a visiting tenant location, according to an aspect of the subject innovation. It can be appreciated that the subscriber 506, HSS 508, E-CSCF 510, PCSCF 512, BGCF 516, and PSAP 526 can each include their respective functionality, as more fully described herein, for example, with regard to system 500.

According to an aspect, the subscriber 506 can make an emergency call (e.g., by dialing 911 from a handset). At 1, the call establishment signaling (SIP INVITE) can be sent to the P-CSCF 512. Further, at 2, the P-CSCF 512 can select an E-CSCF 510 to process the call and send the INVITE to the selected E-CSCF 510. On receiving the INVITE, at 3, the E-CSCF 510 can query the HSS 508 to retrieve the subscriber's E911 profile. In this example, since the subscriber 506 is at a visiting tenant location, the subscriber's E911 profile can include a TTN and an ESRN and the LRF indicator can be set to "No". At 4, the HSS 508 can provide the subscriber's E911 profile to the E-CSCF 510. At 5, the E-CSCF 510 can employ the ESRN from the E911 profile to route the call to the appropriate BGCF 516 (and/or ESGW 518), which can route the call to a selective router (SR) (not shown). The SR can employ the TTN to route the call to the PSAP.

Figure 8:
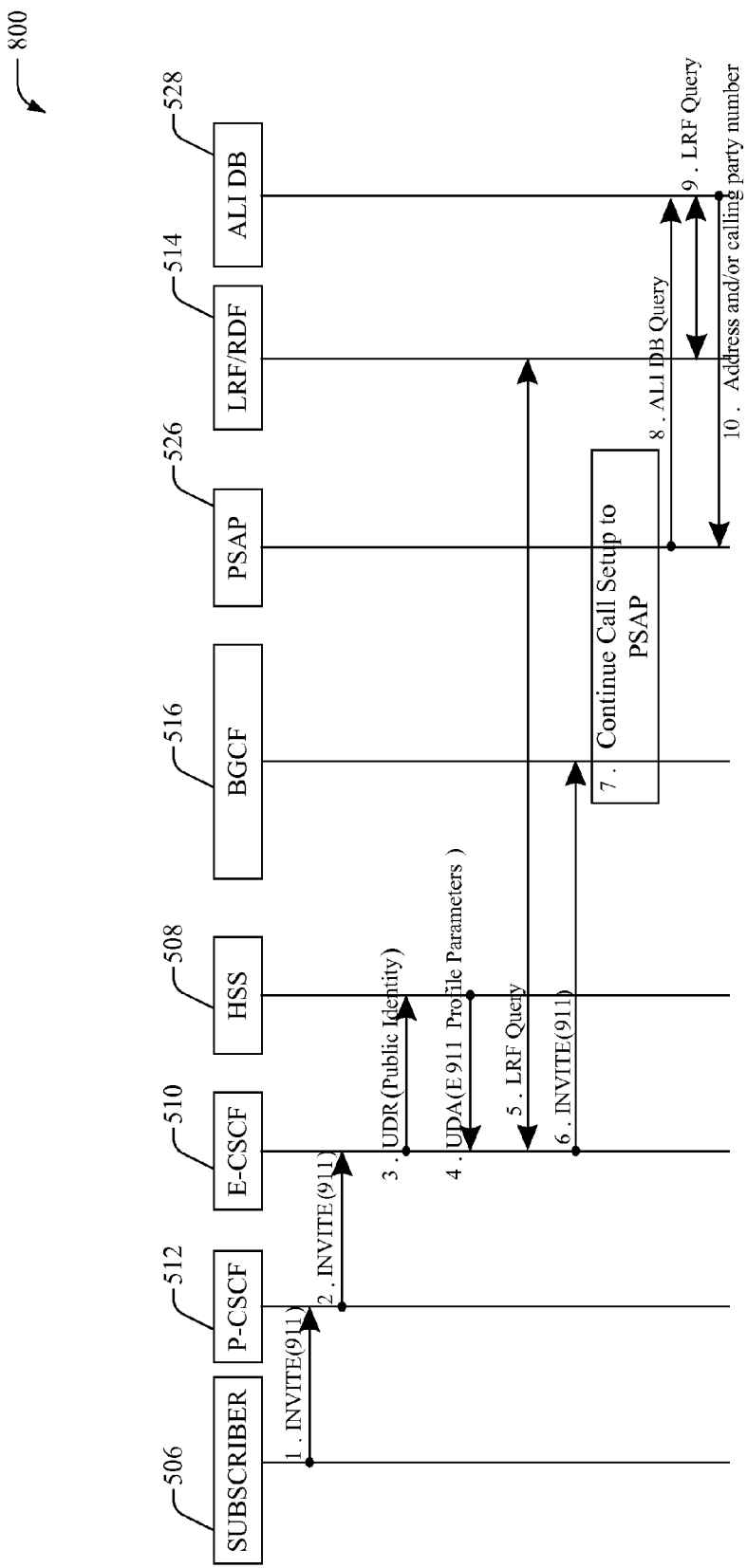
FIG. 8 illustrates an example call flow that depicts processing of an emergency call from a nomadic subscriber, according to an aspect of the subject disclosure.

FIG. 8 illustrates an example call flow 800 that depicts processing of an emergency call from a nomadic subscriber, according to an aspect of the subject disclosure. It can be appreciated that the subscriber 506, HSS 508, E-CSCF 510, PCSCF 512, LRF/RDF 514, BGCF 516, PSAP 526 and ALI DB 528 can each include their respective functionality, as more fully described herein, for example, with regard to system 500.

In accordance with an embodiment, the nomadic subscriber 506 can make an emergency call (e.g., by dialing 911 from a handset). At 1, the call establishment signaling (SIP INVITE) can be sent to the P-CSCF 512. At 2, the P-CSCF 512 can select an E-CSCF 510 to process the call and send the INVITE to the selected E-CSCF 510. On receiving the INVITE, at 3, the E-CSCF 510 can query the HSS 508 to fetch the subscriber's E911 profile. In this example, the E911 profile associated with the subscriber comprises an LRF indicator that is set to "Yes" and null ESRN and TTN parameters. At 4, the E-CSCF 510 receives the subscriber's E911 profile from the HSS 508. The E-CSCF 510 determines that the LRF indicator in the E911 profile is set to "Yes" and accordingly at 5, the E-CSCF 510 queries the LRF/RDF 514 to retrieve an ESRN and an ESQK associated with the call. Based on the received information, at 6, the E-CSCF 510 can route the call to the appropriate BGCF 516 (and/or ESGW 518) by sending the INVITE. Further, the BGCF 516 can employ the ESRN to determine an appropriate ESGW 518 for routing the call (not shown). Moreover, the ESGW 518 can employ the ESRN to select the appropriate trunks and set up the call to an appropriate SR (not shown), which can employ the ESQK to select a PSAP 526 that can service the call. As shown at 7, the call set up can continue to the selected PSAP 526. At 8, the PSAP 526 can query the ALI DB 528 with the ESQK. At 9, the ALI DB 528 can query the LRF/RDF 514 to obtain an address for the subscriber and/or a calling party number associated with the call. Accordingly, at 10, the ALI DB 528 can return information such as, but not limited to, an address for the subscriber and/or a calling party number associated with the call, to the PSAP 526.

FIGS. 9-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
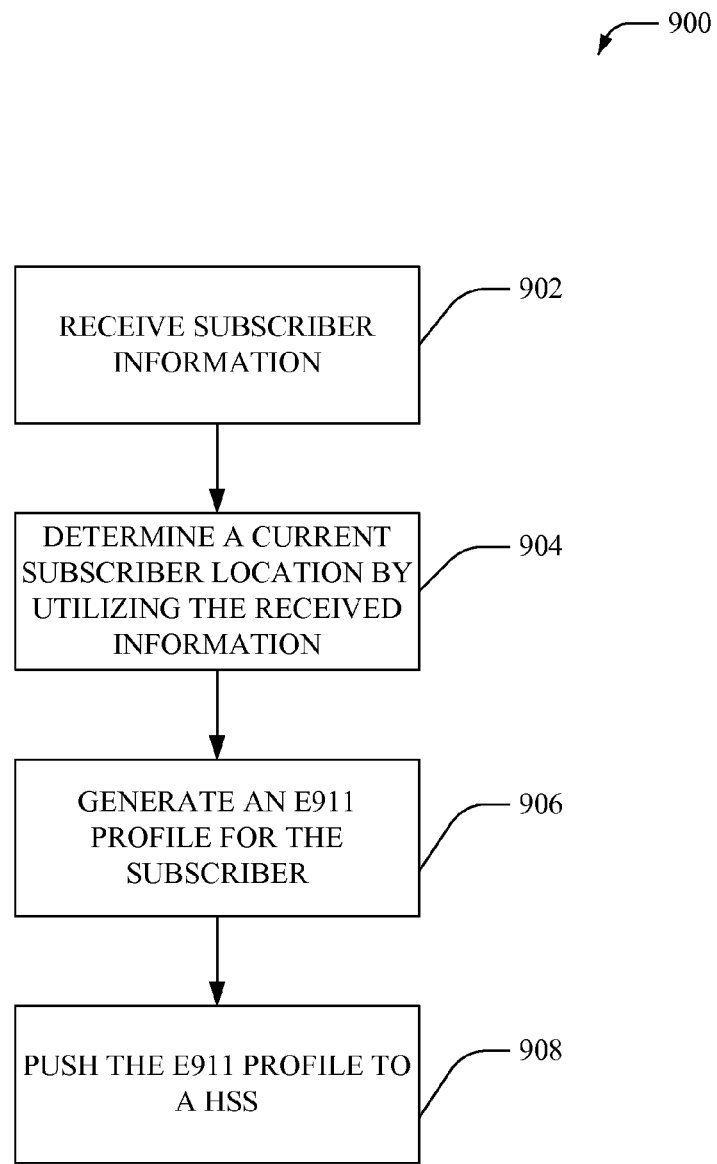
FIG. 9 illustrates an example methodology that facilitates storing current user location information in a HSS of an IMS, according to an aspect of the subject innovation.

Referring now to FIG. 9, there illustrated is an example methodology 900 that facilitates storing current user location information in a HSS (or most any disparate data store) of an IMS, according to an aspect of the subject innovation. At 902, subscriber information can be received. In one example, subscriber information can include, but is not limited to, subscriber's IP address. Moreover, when the subscriber registers with a VoIP network, the registration IP address can be identified and a change in registration IP address can be detected. At 904, a current subscriber location is determined by utilizing the received information. According to an aspect, the subscriber's IP address can be employed to classify the subscriber's location (e.g., the subscriber is located at the subscriber's home location, the subscriber is located at a location that known to an AS (different from the home location), or the subscriber is located at a location that is unknown to the AS). For example, the registration IP address can be compared with a list of predefined tenant IP addresses and/or a home IP address associated with the subscriber to determine the subscriber's current location.

At 906, an E911 profile is generated for the subscriber. It can be appreciated that a new E911 profile can be created or an existing E911 profile can be updated and/or modified. Typically, the E911 profile can include parameters, such as but not limited to, TTN, ESRN, LRF indicator, etc. Typically, the E911 profile parameters can facilitate routing of an emergency call to an optimal PSAP and can provide information such as, but not limited to, a call back number, subscriber location, etc. At 908, the E911 profile is pushed to the HSS (or most any disparate data store) of the IMS. The E911 profile can then be stored in the HSS and can be queried by an E-CSCF during emergency call processing.

Figure 10:
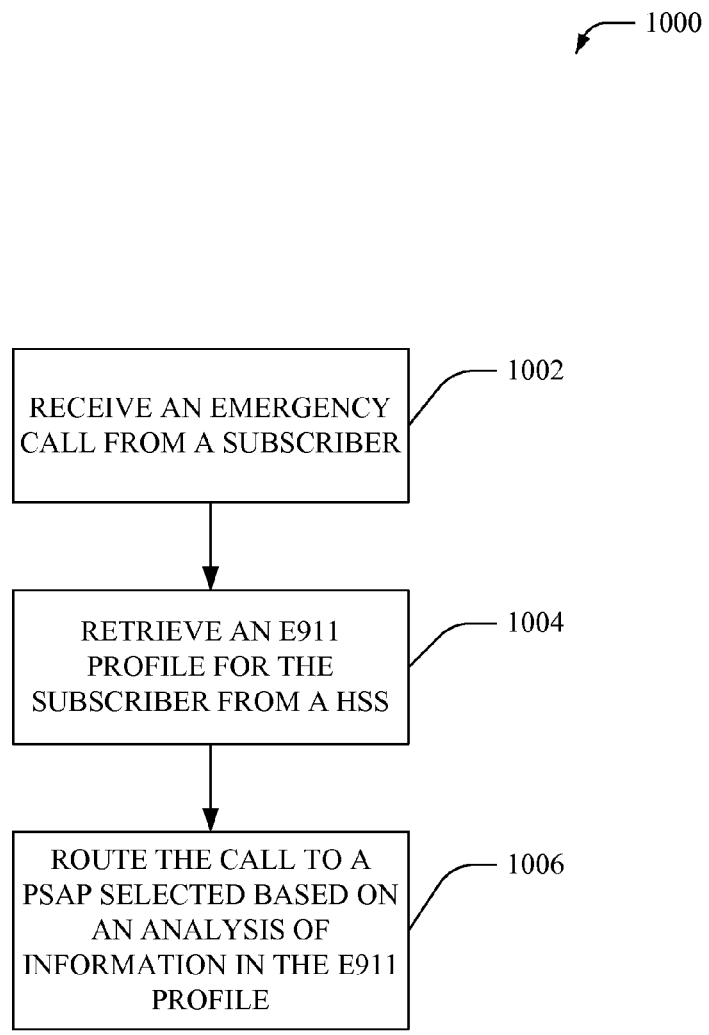
FIG. 10 illustrates an example methodology for routing emergency calls from a VoIP subscriber in accordance with an aspect of the subject disclosure.

FIG. 10 illustrates an example methodology 1000 for routing emergency calls from a VoIP subscriber in accordance with an aspect of the subject disclosure. At 1002, an emergency call can be received from the subscriber. For example, a subscriber in the United States of America can dial the digits 911 on the VoIP phone to initiate the call. Typically, components of the IMS can receive the call and identify that the call is an emergency call. At 1004, an E911 profile associated with the subscriber can be retrieved from an HSS (or most any data store) in the IMS. Typically, an AS can generate and/or update E911 profiles for each subscriber and push the current E911 profiles to the HSS (or most any data store) in the IMS.

Further, at 1006, the call can be routed to a PSAP that is selected based on an analysis of the information in the E911 profile. The analysis can facilitate selection of an optimal PSAP that can be closest to the subscriber's location, and/or can have a maximum number of available resources to attend to the emergency call.

Figure 11:
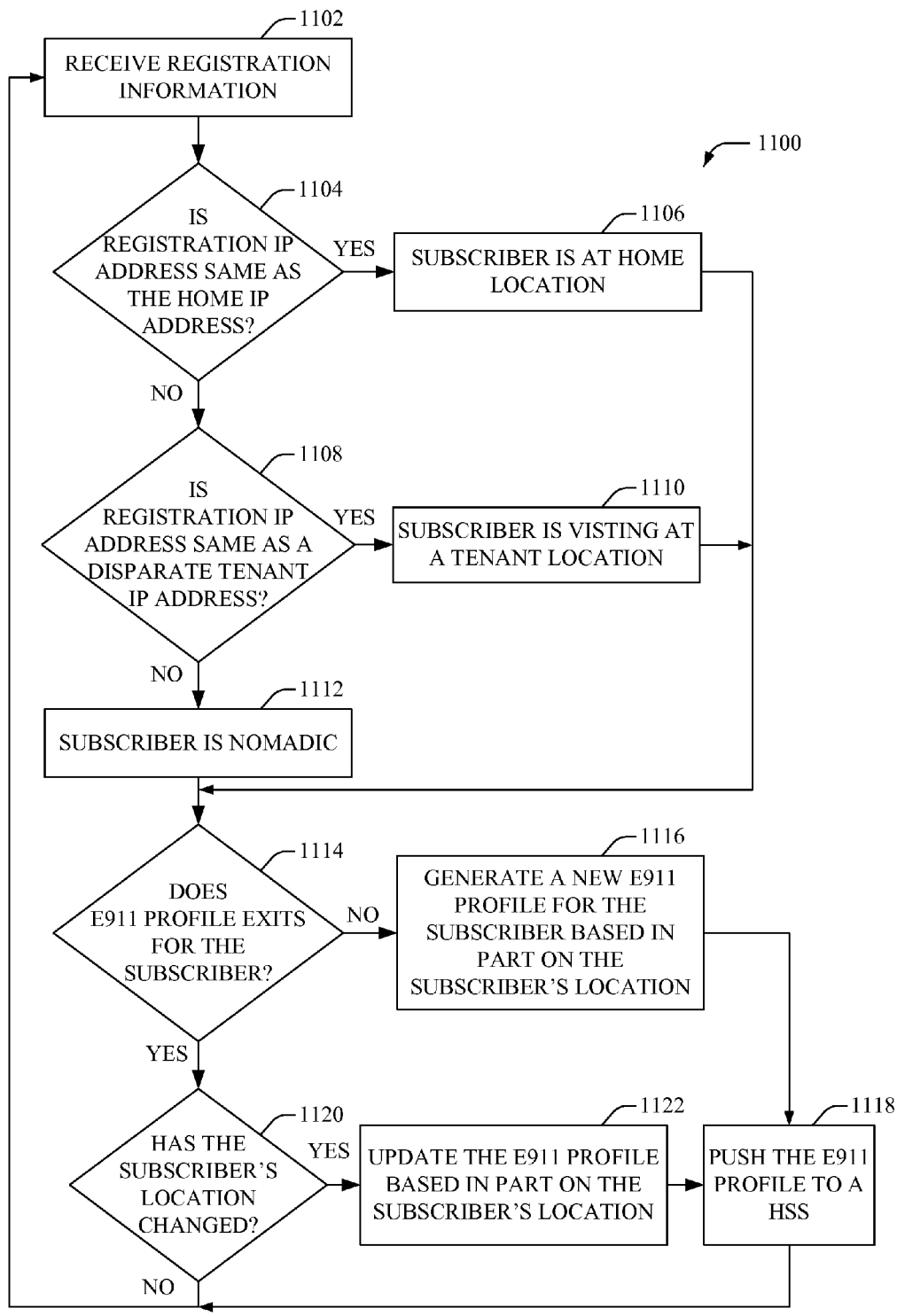
FIG. 11 illustrates an example methodology that facilitates storing an E911 profile within an IMS, according to an aspect of the subject innovation.

FIG. 11 illustrates an example methodology 1100 that facilitates creating an E911 profile for a VoIP subscriber and storing the E911 profile within an IMS, according to an aspect of the subject innovation. Service logic that supports automatic and seamless determination of subscriber location can resides in an Application Server (AS). However, 3GPP IMS standards do not include an AS in the standard call flow for an emergency call. Thus, the AS can generate an E911 profile and push the E911 profile to a data store within the IMS. At 1102, registration information associated with a subscriber can be received. Typically, when a subscriber registers with the network (at most any location), the registration IP address can be identified based on the registration information. At 1104, it can be determined whether the registration IP address is the same as an IP address associated with the subscriber's home location (home IP address), which can be predefined during network provisioning and/or initial setup. When the registration IP address is the same as the home IP address for the subscriber, it can be determined that the subscriber is at the home location, as shown at 1106. When the registration IP address is not equivalent to the home IP address for the subscriber, the registration IP address can be compared to a list of IP addresses associated with a service provider. At 1108, it can be determined whether the registration IP address is the same as an IP address from the list (disparate tenant IP address). Moreover, when determined that the registration IP address is a disparate tenant IP address, at 1110, it can be determined that the subscriber is visiting a tenant location. Alternately, when determined that the registration IP address is not in the list, it can be determined that the subscriber is nomadic, as shown at 1112.

At 1114, it can be determined whether an E911 profile exists for the subscriber. At 1116, a new E911 profile can be generated for the subscriber, based in part on the subscriber's location, when determined that the E911 profile for the subscriber does not already exist in the HSS (or most any data store). Further at 1118, the generated profile can be pushed to a HSS (or most any data store) within the IMS. Alternately, when an E911 profile exists for the subscriber, at 1120, it can be determined whether the subscriber's location has changed, for example, by comparing the determined location with the location associated with the existing E911 profile. When the subscriber location is unchanged, methodology 1100 can be repeated when new registration information is received. However, when the subscriber location changes, the E911 profile can be updated based in part on the new location as shown at 1122. At 1118, the updated E911 profile can be pushed to a HSS (or most any data store) within the IMS. Thereafter, the methodology 1100 can be repeated each time new registration information is received.

Figure 12:
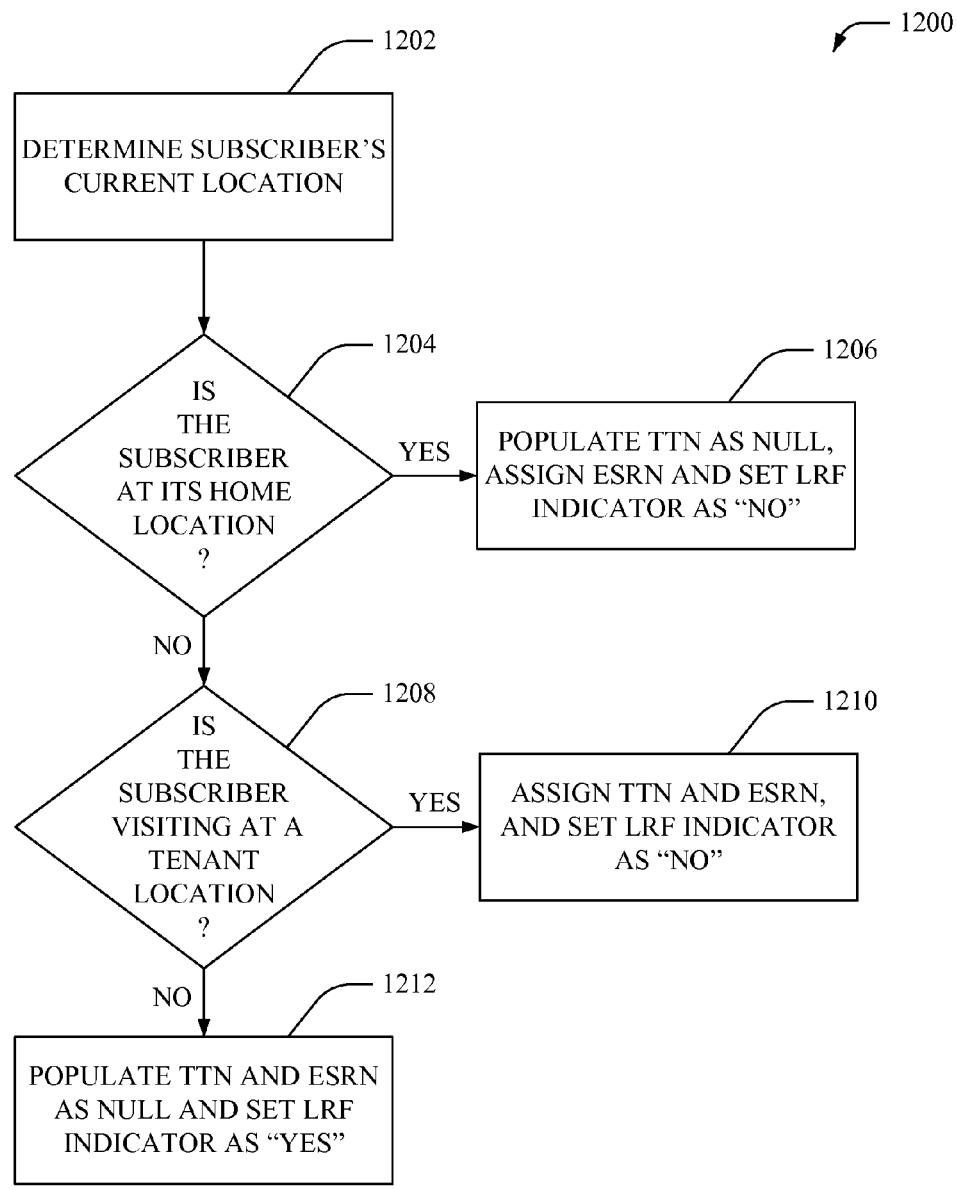
FIG. 12 illustrates an example methodology that can be employed to facilitate E911 profile generation for a subscriber in accordance with an aspect of the subject disclosure.

Referring to FIG. 12, there illustrated is an example methodology 1200 that can be employed to facilitate E911 profile generation for a subscriber in accordance with an aspect of the subject disclosure. According to an aspect, the E911 profile can be pushed to a data store within the IMS, for example the HSS, such that, the HSS stores a current and up-to-date E911 profile associated with each subscriber. During emergency call processing, an E-CSCF in the IMS can retrieve the appropriate E911 profile parameters associated with the subscriber from the HSS and employ the E911 profile parameters to determine a route for the received emergency call.

At 1202, the subscriber's current location can be determined. In one example, the IP address employed by the subscriber during registration can be utilized for determining the subscriber's location. Specifically, the subscriber can be classified as, at a home location, visiting at a tenant location, or nomadic. At 1204, it can be determined whether the subscriber is at the home location. Moreover, at 1206, when the subscriber is at the home location, the TTN can be populated as null, an ESRN can be assigned and the LRF indicator can be set as "No". It can be appreciated that a flag can be employed as the LRF indicator. At 1208, it can be determined whether the subscriber is visiting at a tenant location. At 1210, a TTN and ERSN can be assigned and the LRF indicator can be set as "No", when determined that subscriber is visiting a tenant location. Alternately, at 1212, both the TTN and ERSN can be populated as null and the LRF indicator can be set as "Yes", when determined that subscriber is nomadic (neither at home location nor at a tenant location).

Figure 13:
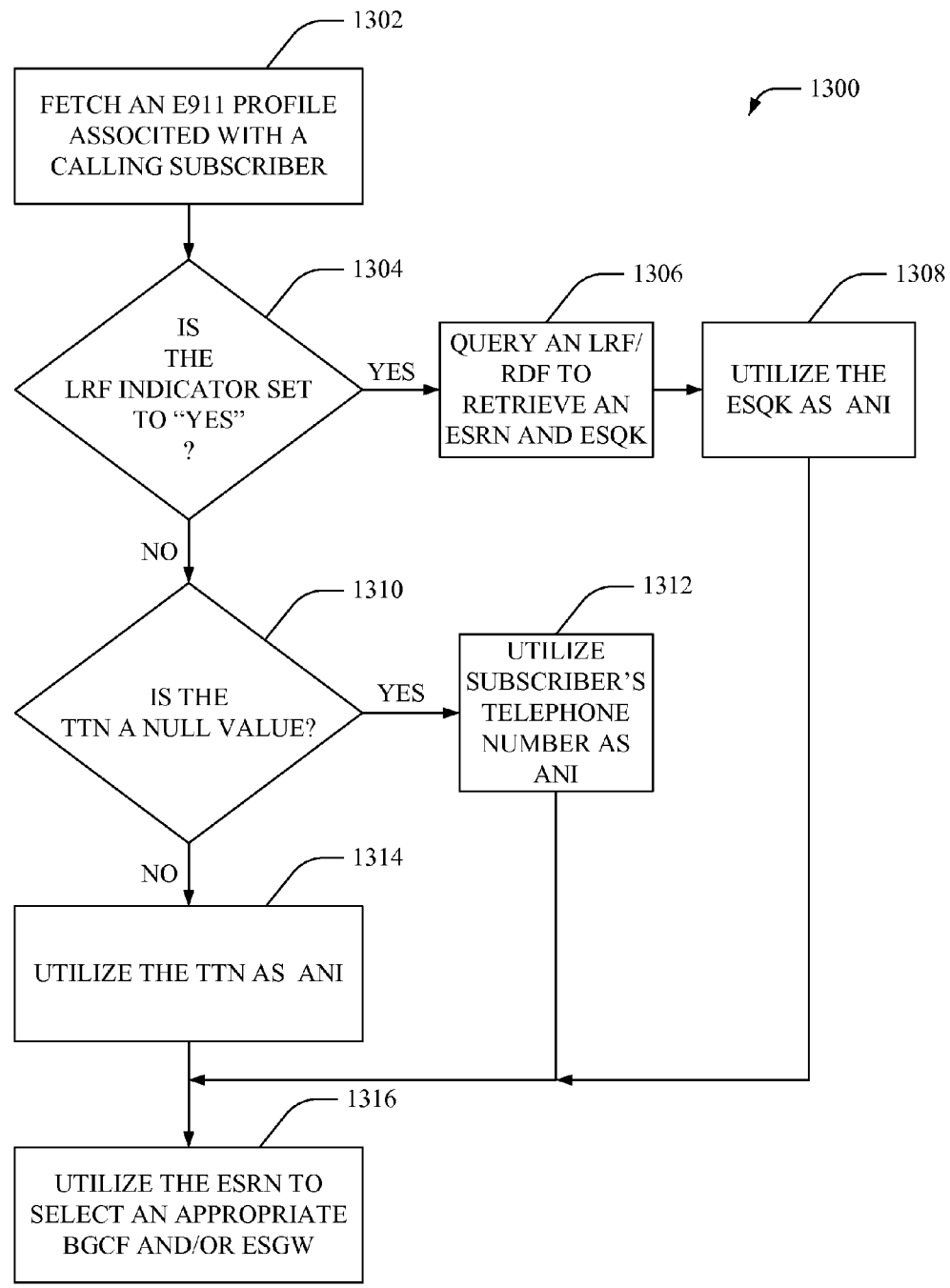
FIG. 13 illustrates an example methodology that can be employed to utilize an E911 profile, stored in a data store within the IMS, to facilitate emergency call processing, according to an aspect of the subject disclosure.

FIG. 13 illustrates an example methodology 1300 that can be employed to utilize an E911 profile stored in a data store within the IMS to facilitate emergency call processing, according to an aspect of the subject disclosure. In one embodiment, when an emergency call is received by the IMS from a subscriber, methodology 1300 can be employed to optimally process and/or route the call. Specifically, at 1302, an E911 profile associated with the calling subscriber can be fetched from a data store within the IMS, such as, the HSS. In one aspect, an AS can generate and/or update E911 profiles associated with each subscriber based on the current subscriber location and push the profile information to the data store (e.g., HSS). As an example, the E911 profile can include parameters, such as, but not limited to, a TTN, an ESRN, and/or an LRF indicator.

At 1304, the LRF indicator included in the E911 profile can be checked. Typically, the LRF indicator is set to "Yes" when the subscriber is nomadic. Accordingly, at 1360, when the LRF indicator is set to "Yes", an LRF/RDF can be queried to retrieve an ESRN and an ESQK. Further, at 1308, the ESQK can be utilized as the ANI for the emergency call. Alternately, at 1310, when the LRF indicator is set to "No", it can be determined if the TTN is populated as a null value. In one example, when the subscriber is at the home location, the TTN is populated as a null value. Accordingly, at 1312, when the TTN is a null, the subscriber's calling telephone number can be utilized as the ANI. In contrast, at 1314, the TTN can be employed as the ANI when the TTN is not a null value (e.g., subscriber is visiting a tenant location). At 1316, the ESRN can be utilized to select an appropriate and/or optimal BGCF and/or ESGW to route the call. Specifically, when the subscriber is at a home or tenant location, the ESRN value is assigned and can be obtained from the E911 profile of the subscriber. However, when the subscriber is nomadic, the ESRN can be queried from the LRF/RDF (as shown at 1360).

Figure 14:
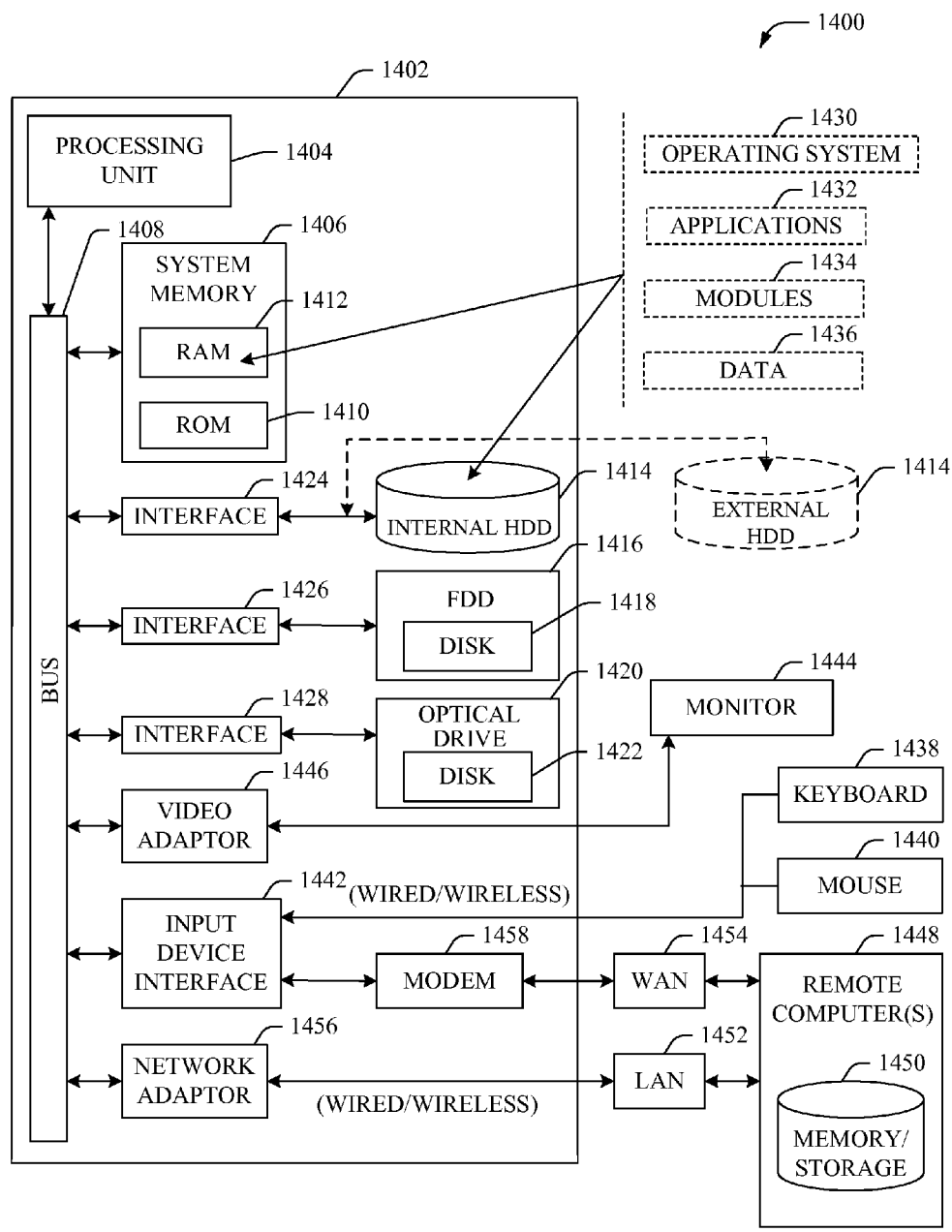
FIG. 14 illustrates a block diagram of a computer operable to execute the disclosed architecture.

Referring now to FIG. 14, there is illustrated a block diagram of a computer operable to execute the disclosed architecture that facilitates processing emergency calls in a 3GPP IMS. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, or advantages of the subject innovation described in the subject specification can be exploited in substantially any wired and/or wireless communication technology. For instance, 4G, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store instructions; and
    a processor, coupled to the memory, that facilitates execution of the instructions to perform operations, comprising:
        in response to determining that an emergency call has been received from a user equipment, receiving profile data that comprises temporary telephone number data, emergency services routing number data, and location routing functionality indicator data associated with the user equipment, wherein the profile data is updated based on internet protocol address data received from the user equipment during a connection of the user equipment to a communication network,
        determining that the user equipment is located at a tenant location associated with a business account to which the user equipment is subscribed, comprising:
            determining that the temporary telephone number data comprises a defined telephone number assigned to a device within the tenant location,
            determining that the emergency services routing number data comprises an emergency services routing number assigned to the user equipment, and
            determining that the location routing functionality indicator data specifies that a location routing function device of the communication network is not to be queried subsequent to receiving the emergency call, and
        in response to the determining that the user equipment is located at the tenant location, facilitating a transmission of the defined telephone number to a public safety answering point device that is selected based on the emergency services routing number, wherein the defined telephone number is employed by the public safety answering point device as a call back number for the user equipment.

2. The system of claim 1, wherein the operations further comprise:
    determining that the user equipment is nomadic, comprising:
        determining that the temporary telephone number data comprises a null value,
        determining that the emergency services routing number data comprises a null value, and
        determining that the location routing functionality indicator data specifies that the location routing function device is to be queried subsequent to receiving the emergency call.

3. The system of claim 2, wherein the operations further comprise:
    in response to the determining that the user equipment is nomadic, directing, to the location routing function device, request data indicative of a request for emergency services query key data and the emergency services routing number.

4. The system of claim 3, wherein the transmission is a first transmission and the operations further comprise:

in response to receiving, from the location routing function device, the emergency services query key data and the emergency services routing number, facilitating a second transmission of the emergency services query key data to the public safety answering point device that is selected based on the emergency services routing number, wherein the emergency services query key data is employed by the public safety answering point device as the call back number.

5. The system of claim 4, wherein the emergency services query key data is employed to access a location identification data store of the communication network to determine address information associated with the user equipment.

6. The system of claim 1, wherein the operations further comprise:
 determining that the user equipment at a home location, comprising:
  determining that the temporary telephone number data comprises a null value,
  determining that the emergency services routing number data comprises the emergency services routing number assigned to the user equipment, and
  determining that the location routing functionality indicator data specifies that the location routing function device is not to be queried subsequent to receiving the emergency call.

7. The system of claim 6, wherein the transmission is a first transmission and the operations further comprise:
 in response to the determining that the user equipment is at the home location, facilitating a second transmission of data indicative of a telephone number of the user equipment to the public safety answering point device that is selected based on the emergency services routing number, wherein the telephone number is employed by the public safety answering point device as the call back number.

8. The system of claim 1, wherein the defined telephone number is employed to access a location identification data store of the communication network to determine address information associated with the user equipment.

9. The system of claim 1, wherein the public safety answering point device is selected based on resource availability data related to the public safety answering point device.

10. The system of claim 1, wherein the public safety answering point device is selected based on a distance between the public safety answering point device and the user equipment being determined to satisfy a distance criterion.

11. A method, comprising:
 in response to receiving an emergency call from a user equipment, determining, by a system comprising a processor, profile data associated with the user equipment that comprises temporary telephone number data, emergency services routing number data, and location routing functionality indicator data, wherein the profile data is specified based on internet protocol address data received from the user equipment during a registration of the user equipment to a communication network,
 determining, by the system, that the user equipment is located at a tenant location associated with a business account to which the user equipment is subscribed based on determining that
  the temporary telephone number data comprises a defined telephone number assigned to a device within the tenant location,
  the emergency services routing number data comprises an emergency services routing number assigned to the user equipment, and
  the location routing functionality indicator data specifies that a location routing function device of the communication network is not to be queried subsequent to receiving the emergency call, and
 subsequent to the determining that the user equipment is located at the tenant location, selecting, by the system, a public safety answering point device to service the emergency call based on the emergency services routing number.

12. The method of claim 11, further comprising:
 directing, by the system, the defined telephone number to the public safety answering point device to facilitate servicing of the emergency call, wherein the defined telephone number is employed by the public safety answering point device as a call back number for the user equipment.

13. The method of claim 11, further comprising:
 determining, by the system, that the user equipment is nomadic based on determining that
  the temporary telephone number data comprises a null value,
  the emergency services routing number data comprises a null value, and
  the location routing functionality indicator data specifies that the location routing function device is to be queried subsequent to receiving the emergency call.

14. The method of claim 13, further comprising:
 in response to the determining that the user equipment is nomadic, receiving, by the system, emergency services query key data and the emergency services routing number from the location routing function device; and
 facilitating, by the system, a transmission of the emergency services query key data to the public safety answering point device, wherein the emergency services query key data is employed by the public safety answering point device as a call back number for the user equipment.

15. The method of claim 11, further comprising:
 determining, by the system, that the user equipment at a home location associated with the user equipment based on determining that
  the temporary telephone number data comprises a null value,
  the emergency services routing number data comprises the emergency services routing number assigned to the user equipment, and
  the location routing functionality indicator data specifies that the location routing function device is not to be queried subsequent to receiving the emergency call.

16. The method of claim 15, further comprising:
 in response to the determining that the user equipment is at the home location, facilitating, by the system, a transmission of data indicative of a telephone number of the user equipment to the public safety answering point device, wherein the telephone number is employed by the public safety answering point device as a call back number for the user equipment.

17. A non-transitory computer-readable medium comprising computer-executable instructions that, in response to execution, cause a system comprising a processor to perform operations, comprising:
 in response to receiving an emergency call from a user equipment, determining profile data associated with the user equipment, wherein the profile data comprises temporary telephone number data, emergency services routing number data, and location routing functionality indicator data associated with the user equipment that is specified based on internet protocol address data received from the user equipment during a registration of the user equipment to a communication network, determining that the user equipment is located at a tenant location associated with a business account to which the user equipment is subscribed in response to determining that the temporary telephone number data comprises a defined telephone number assigned to a device within the tenant location, the emergency services routing number data comprises an emergency services routing number assigned to the user equipment, and the location routing functionality indicator data specifies that a location routing function device of the communication network is not to be queried subsequent to receiving the emergency call, and in response to the determining that the user equipment is located at the tenant location, selecting, facilitating a transmission of the defined telephone number to a public safety answering point device that is selected based on the emergency services routing number, wherein the defined telephone number is employed by the public safety answering point device as a call back number for the user equipment.

18. The non-transitory computer-readable medium of claim 17, wherein the operations further comprise:

determining that the user equipment is nomadic in response to determining that:

the temporary telephone number data comprises a null value, the emergency services routing number data comprises a null value, and the location routing functionality indicator data specifies that the location routing function device is to be queried subsequent to receiving the emergency call.

19. The non-transitory computer-readable medium of claim 18, wherein the transmission is a first transmission and the operations further comprise:

in response to the determining that the user equipment is nomadic, facilitating a second transmission of the emergency services query key data, received from the location routing function device, to the public safety answering point device, wherein the emergency services query key data is employed by the public safety answering point device as the call back number.

20. The non-transitory computer-readable medium of claim 17, wherein the user equipment is subscribed to a business voice over internet protocol service that facilitates voice over internet protocol communication via an access point device at the tenant location.

* * * * *